Patented May 15, 1951

2,553,048

UNITED STATES PATENT OFFICE 2,553,048

HALOGENATED NAPHTHOQUINONE IMIDES AND A PROCESS OF MAKING SAME

Valentin Kartaschoff, Basel, Switzerland, assignor to Sandoz A. G., Basel, Switzerland, a Swiss firm No Drawing. Application October 10, 1949, Serial No. 120,597. In Switzerland February 20, 1946

8 Claims. (Cl. 260—396)

1

The present invention primarily relates to new halogenated naphthoquinone-imides as well as to a method for the production of such halogenated naphthoquinone-imides.

According to the present invention the new valuable halogenated naphthoquinone-imides can be prepared by treating naphthoquinone-imides with halongenating agents, preferably in the presence of catalysts.

The naphthoquinone-imides used as starting materials according to the present invention can be obtained in known manner by treatment of 1,5-dinitronaphthalene or its β-substituted derivatives with reducing agents. The halogenation of the naphthoquinone-imides thus produced can advantageously be carried out in one stage simultaneously with their formation in a suitable solvent, preferably in the presence of catalysts, and under the influence of ultra-violet light.

As starting compounds for the preparation of the new halogeno-compounds I preferably use 1,5-nitronaphthalene and its substitution products carrying in β-position atoms or groups, such for example as halogen, sulfo, hydroxy, alkoxy and acylamino. The conversion of these starting products into naphthoquinone-imides is preferably carried out by treating the said dinitro compounds with sulfur sesquioxide in presence of sulfuric acid or of fuming sulfuric acid or by treating them with reducing agents, such for example as finely granulated or powdered metals, in presence of an acid. By working with sulfur sesquioxide the reduction and conversion process goes smoothly and, for the subsequent halogenation, it becomes unnecessary to isolate the naphthoquinone-imides formed in the sulfuric acid medium.

The halogenation itself is carried out preferably in presence of catalysts, such for example as iodine, iron, antimony halides and the like, and at a temperature between room-temperature and 110° C. for a low degree of halogenation and up to 160° to 200° C., if a high degree of halogenation is desired.

As suitable reaction media, e. g. the following solvents may be used:

Water
Sulfuric acid of various concentrations
Fuming sulfuric acid of various concentrations
Acetic acid
Carbon tetrachloride
Tetrachloro-ethane
Nitrobenzene
Trichloro-benzene
O-Dichloro-benzene i. e.

2

It is not necessary that the whole starting compound is dissolved, but it is preferable to use it in such a case in form of a very fine dispersion. When water or diluted sulfuric acid of less than 84.5% are used as halogenation media, the reaction is carried out at temperatures below 40° C. because the diluted hydrochloric as well as the diluted hydrobromic acid obtained as by-product during the halogenation would hydrolyse the compounds at more elevated temperatures.

The halogenated compounds can easily be isolated, as they are generally insoluble or difficultly soluble in water.

The new halogenated compounds are halogen derivatives of naphthoquinone-imides, as is manifest from the following:

It is known that, on treatment of 1,5-dinitronaphthalene with suitable reduction agents, as e. g. sulfur sesquioxide the so-called naphthazarine intermediate of the formula

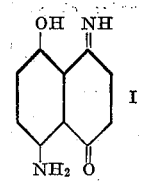

will be obtained as final product of the reaction, which intermediate can be converted into naphthazarine

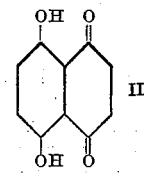

by hydrolyzing, e. g. with hot aqueous acids.

As the two nitrogen-containing groups of the 5-amino - 8 - hydroxy - 1,4 - naphthoquinone-1-imide (Formula I) are absolutely identical in their chemical behaviour towards various reagents, which follows from the fact that the said compound reacts neither as an amine nor as a naphthol nor as a quinone, its formula may preferably be written in the following more modern manner:

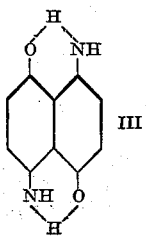

According to the present invention, the halogenation takes place during or after the formation of the naphthazarine intermediate; and the reactions may be formulated e. g. in the case of bromination as follows:

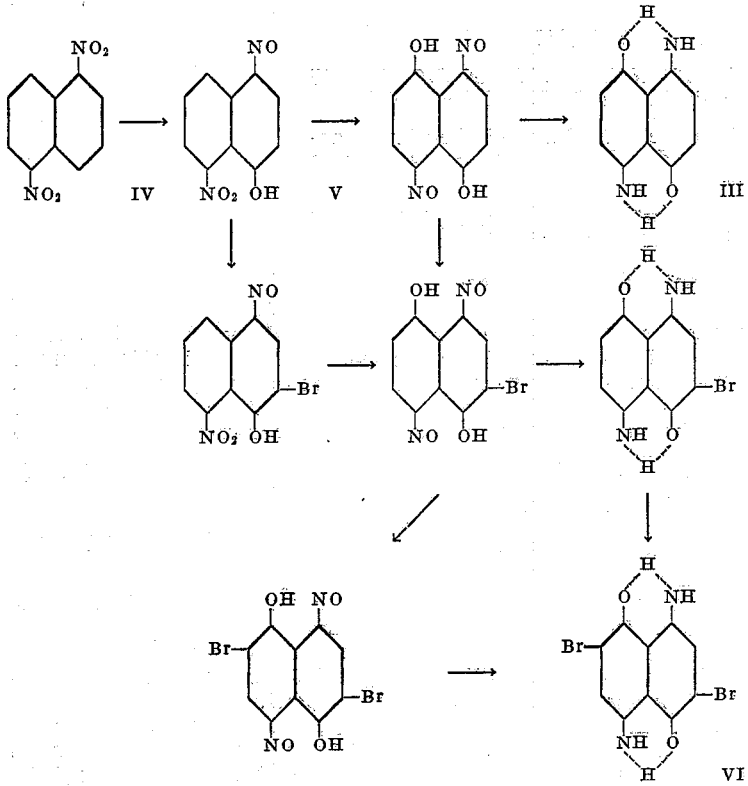

Similar reactions take place in the case of chlorination.

The intermediate obtained after the reduction of 1,5-dinitronaphthalene and possessing the Formula III is very easily soluble in concentrated sulfuric acid in form of its sulfoester or leucosulfoester. Only this fact can explain the large solubility in this reaction medium of all the compounds of this class.

The fact that the new compounds are strongly colored, indicates the concentration of chromophore groups which is to be found in the Formula VI. That these compounds are of a quinoid character is revealed by the fact that they may be reduced with alkaline reducing agents, like sodium sulfide, alkali hydrosulfite and alkali glucose solution, giving water-soluble hydro- or leuco-compounds, which, when the reduction has been carried out smoothly, give on re-oxidation the starting products. But if the alkaline reduction has been carried out at an elevated temperature or in presence of a large amount of alkali, then it will be observed that a partial dehalogenation has taken place, and the oxidized products become more or less soluble in alkaline solutions, which is due probably to an exchange of a halogen atom for a hydroxy group. In the di-, tri- and tetra-halogeno derivatives some of the halogen atoms are very labile and can easily be replaced by other groups; for this reason the new compounds are valuable starting products for the manufacture of various dyestuffs.

The new halogenated naphthoquinone imides are violet to blue-colored compounds which are generally insoluble in water, but soluble in ethanol with a red, violet or pure blue color and also soluble in concentrated sulfuric acid with a yellow, olive, red-brown to reddish-brown color. They can be used as dyestuffs and also as intermediate products for the manufacture thereof.

The following examples illustrate how the invention may be carried out, but they are in no way limitative.

*Example 1*

37.6 grams of the compound of Formula III are suspended in 500 grams of glacial acetic acid, and heated to 65° C. with good stirring. To this suspension there are added 32.8 grams of anhydrous sodium acetate. 64 grams of bromine are then dropped in during 45 minutes. The whole reaction mass is stirred at the same temperature for another ½ hour. While the starting product is going into the solution, the new halogenated derivative separates out as a dark amorphous powder. As its solubility in glacial acetic acid is rather small, it can be isolated by filtration of the cold suspension. The new product consists of the compound of the Formula VI. It is soluble in ethanol with a pure blue coloration (absorption maxima at 630–579 m$\mu$) and in concentrated sulfuric acid with a pure yellow coloration turning to blue after addition of paraformaldehyde.

*Example 2*

50 grams of 1,5-dinitronaphthalene and 14 grams of sulfur are suspended in 1000 grams of sulfuric acid monohydrate. 200 grams of oleum (40% $SO_3$) are allowed to run into this suspension at such a rate that the temperature rises to 50–55° C. All the 1,5-dinitronaphthalene becomes dissolved after about 1 hour, and a red-violet solution is obtained. A sample withdrawn therefrom is soluble in ethanol with a brown color. 100 grams of bromine are allowed to run in at 50° C. The evolution of hydrobromic acid begins immediately. The product is stirred for 24 hours at 50° C., and the temperature is then raised to 70° C., the stirring being continued at this temperature for further 60 hours. The course of the bromination can best be followed spectroscopically. The bromination is completed when a sample diluted with ethanol shows the maxima of the two chief absorption bands at 630 and 579 mµ. The product is then poured into ice-water, filtered and thoroughly washed with hot water. There is thus obtained 65 grams of a dark blue slightly bronzy substance, which does not melt when heated to above 300° C. Analysis gives Br 44.6%; N 7.9% (theory for the compound of Formula VI: Br 46.2%; N 8.1%).

On blowing air into the dark colored mother-liquor a certain amount of a low-brominated product that precipitates can be isolated; its bromine content was found to be 33.49%, which would correspond to an impure monobromo derivative (theory for monobromine 30.0%).

By purification both products may be obtained in a much purer state and give then the following color reactions:

| Solvent | Dibromo compound | Monobromo compound |
|---|---|---|
| benzene | pure brilliant blue | violet. |
| glacial acetic acid | do | Do. |
| nitrobenzene | greenish blue | blue. |
| hydrochloric acid | pure green | yellow. |
| (on heating to boil) | bluish red | yellowish red. |
| $H_2SO_4$ | brown-yellow | brown red. |
| $H_2SO_4$+boric acid on standing for 24 hours. | somewhat browner | dull red-violet. |
| (on addition of paraformaldehyde). | brilliant blue | violet. |

Example 3

10 grams of 1,5-dinitronaphthalene are suspended in 200 grams of sulfuric acid of 96° Bé. and heated to 100° C. 10 grams of coarse tin filings are now added in small portions so that the temperature slowly rises to 130° C. The introduction of the tin requires about 1 hour, and the product is then cooled to about 20° C., whereupon about 0.1 gram of iodine is added and 20 grams of bromine allowed to run in. The product is warmed at 70–90° C. for about 20 hours during which time the bromine almost completely disappears. The excess of bromine is blown off by means of an air current, and the product poured into a mixture of ice and water. 12 grams of a bromo compound are obtained which is soluble in ethanol with a blue-violet color.

Example 4

10 grams of 1,5-dinitronaphthalene and 2.8 grams of sulfur are added to 200 grams of sulfuric acid monohydrate, and 40 grams of oleum (40 per cent $SO_3$) caused to run in at 30° C. While irradiated by an ultraviolet lamp, 01. gram of iodine is added and a current of dry chlorine introduced. The product is then warmed to 70° C. for 24 hours while maintaining the irradiation and the introduction of the current of chlorine gas. A sample taken from the product is difficultly soluble in ethanol with a blue-green color and shows absorption maxima at 627 and 578 mµ in dilute ethanol solution. The product is then poured into ice-water, and thoroughly washed. The chloro-compound is a dark blue powder which contains very labile chlorine atoms. Its chlorine content is 26.56% and corresponds essentially to the theoretical content of the compound of the formula

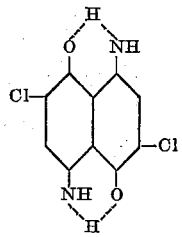

Example 5

37.6 grams of the compound of Formula III are dissolved in 600 grams of nitrobenzene and heated to 60° C. with thorough stirring. In presence of 0.5 gram of iodine, 64 grams of bromine are added. The halogenation proceeds very quickly. After half an hour, a sample is soluble in ethanol with a pure coloration and with the absorption maxima of 630 and 579 mµ. The mass is brought to 0° C., filtered and washed with ether. The new product is identical with that of Example 1. In place of nitrobenzene other organic solvents may be used, such as e. g. carbontetrachloride, tetrachloro-ethane, trichlorobenzene, o-dichloro-benzene, etc.

Example 6

100 grams of 1,5-dinitronaphthalene and 25 grams of sulfur are suspended in 310 grams of sulfuric acid monohydrate. 140 grams of oleum (66% $SO_3$) are allowed to run in slowly at 35° C. The mass is stirred for 16 hours and then 50 grams of water are carefully dropped in, so that the temperature does not rise above 20° C. Then the whole is halogenated with 55 grams of bromine at 60° C. during 24 hours. The product is then poured into ice-water, filtered and thoroughly washed. It consists merely of monobromo derivative of the compound of Formula III. The reaction product is obtained as a dark blue substance, the properties of which correspond to those of the product of Example 2.

Example 7

10 grams of 1,5-dinitronaphthalene and 2.8 grams of sulfur are stirred into 200 grams of sulfuric acid monohydrate and 40 grams of oleum (40 percent $SO_3$) allowed to run in at 20–25° C. The product is stirred for 1 hour and 30 grams of sulfuryl chloride and some iodine added at 30° C. The product is heated for 48 hours at 35–40° C. and poured into a mixture of ice and water. A blue chloro compound is obtained.

Example 8

10 grams of a mixture of 2-chloro-1,5- and of 2-chloro-1,8-dinitronaphthalene and 2.9 grams of sulfur are stirred into 200 grams of sulfuric acid monohydrate and treated with 40 grams of oleum (40 per cent $SO_3$) at 20–34° C. The product is stirred for 1 hour, whereby a light brown solution is obtained. This is allowed to cool to 23° C., some iodine being then added and 20 grams of bromine allowed to flow in. The product is then warmed with stirring to 50° C. for 24 hours and thereupon for 32 hours at 70° C. After this procedure the excess of bromine is blown off by means of a current of air; the product is then poured into ice and water and filtered off and thoroughly washed, whereby a dark blue substance is obtained which contains, besides other products, the compound of the formula

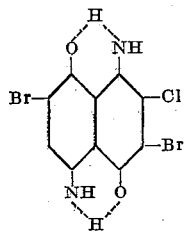

Example 9

37.6 grams of the compound of the Formula III are dissolved in 600 grams of nitrobenzene and heated to 60° C. with good stirring. In presence of 0.5 grams of iodine, 128 grams of bromine are added. The halogenation to the dibromo compound goes very quickly. The temperature is then raised up to 100–110° C. After four hours, the absorption maxima of the solution of a sample in ethanol which is colored in a bluish-green shade, are at 643 and 588 m$\mu$. These maxima do not shift even if the reaction is continued for another 12 hours. The mass is, therefore, brought to 20° C., filtered and washed with ether. The new product consists merely of the compound of the formula

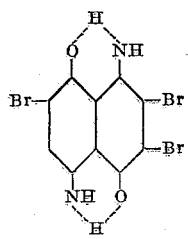

Example 10

10 grams of a mixture of dibromonaphthoquinones obtainable according to Example 2 are suspended in 100 grams of nitrobenzene and after addition of 30 grams of bromine and 0.1 gram of iodine, the resulting mixture is heated, with irradiation with ultra-violet light and vigorous stirring, at 140–160° C. for 10 hours, care being taken that the bromine refluxes. After this time the charge is allowed to cool down, then water is added thereto and the nitrobenzene distilled off with steam. The reaction product that precipitates is filtered off and dried. It is, in a dry state, a nearly black powder, soluble in sulfuric acid with an olive-black coloration. Its bromine content has been found to be of 62.7 per cent (theory for tetrabromo derivative 64.0%). The new derivative corresponds to the compound of the formula

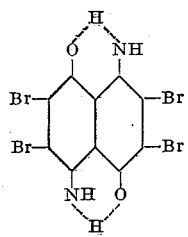

The present application is in part a continuation of application Serial No. 729,401, filed February 18, 1947, now abandoned.

What I claim is:

1. A process for the manufacture of a halogenated naphthoquinone-imide, which comprises the step of subjecting the naphthazarine intermediate of the formula

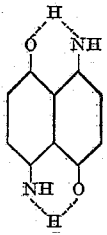

in a diluting agent, to the action of halogenating agent selected from the group consisting of chlorine and bromine.

2. A process for the manufacture of a halogenated naphthoquinone-imide, which comprises the step of subjecting the naphthazarine intermediate of the formula

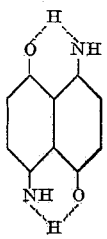

in statu nascendi in sulfuric acid medium used for preparing the latter from 1,5-dinitronaphthalene, to the action of a halogenating agent selected from the group consisting of chlorine and bromine.

3. A process for the manufacture of a dibrominated naphthoquinone-imide which comprises the step of subjecting the naphthazarine intermediate of the formula

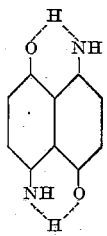

in statu nascendi in sulfuric acid medium used for preparing the latter from 1,5-dinitronaphthalene at a temperature of 60–90° C., to the action of bromine.

4. A process for the manufacture of a dichlorinated naphthoquinone-imide, which comprises the step of subjecting the naphthazarine intermediate of the formula

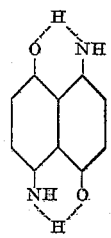

in statu nascendi in sulfuric acid medium used for preparing the latter from 1,5-dinitronaphthalene at a temperature of 60–90° C., to the action of chlorine in presence of iodine as catalyst and while irradiated by an ultraviolet lamp.

5. A halogenated naphthoquinone-imide of the formula

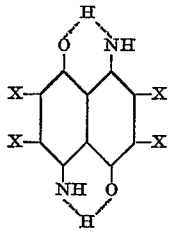

wherein at least one X stands for a halogen atom selected from the group consisting of chlorine and bromine, and the others stand for hydrogen.

6. The tribrominated naphthoquinone-imide of the formula

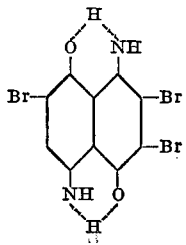

7. The dibrominated naphthoquinone-imide of the formula

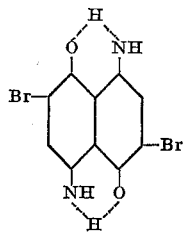

8. The dichlorinated naphthoquinone-imide of the formula

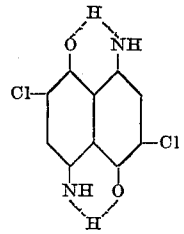

VALENTIN KARTASCHOFF.

REFERENCES CITED

The following references are of record in the file of this patent:

FOREIGN PATENTS

| Number | Country | Date |
|---|---|---|
| 77,330 | Germany | Sept. 21, 1894 |